United States Patent [19]
Foll et al.

[11] 3,744,531
[45] July 10, 1973

[54] PRECISION SPIRALLY WOUND SLEEVE

[76] Inventors: William A. Foll, 4565 Concord Drive, Fairview Park, Ohio 44126; Leonard Buckner, 16292 Paulding Boulevard, Brookpark, Ohio 44142

[22] Filed: Feb. 14, 1972

[21] Appl. No.: 226,193

Related U.S. Application Data
[63] Continuation of Ser. No. 34,150, May 4, 1970.

[52] U.S. Cl................. 138/144, 138/141, 138/145, 264/283
[51] Int. Cl.............................................. F16l 9/14
[58] Field of Search................... 138/129, 137, 140, 138/141, 144, 145; 264/283

[56] References Cited
UNITED STATES PATENTS

| | | | |
|---|---|---|---|
| 2,181,035 | 11/1939 | White | 138/144 |
| 3,524,779 | 8/1970 | Masters | 138/144 X |
| 2,755,821 | 7/1956 | Stahl | 138/144 |
| 3,231,443 | 1/1966 | McNulty | 138/144 X |
| 3,270,778 | 9/1966 | Foll et al | 138/144 |

OTHER PUBLICATIONS
"Machine Design," Publication, Reference Issue on Plastics, June 16, 1966 issue, published by Penton Publishing Co., Cleveland, Ohio.

*Primary Examiner*—Herbert F. Ross
*Attorney*—Oberlin, Maky, Donnelly & Renner

[57] ABSTRACT

A multi-ply precision spirally wound sleeve characterized in that the inside ply is of biaxially creped Kraft paper (sometimes called "X-crepe" paper) and the surrounding ply or plies are of substantially nonstretchable material such as Kraft paper, polyester film, polyimide film, etc., the plies being heat sealed together to provide a smooth and accurate outside diameter. The inside ply is resiliently radially compressible i.e. expansible in inside diameter, so that the sleeve may be snugly fitted on an armature shaft without increase in outside diameter or the sleeve may be employed as a coil form for an adjustable inductor with the tuning slug of powdered iron or brass screwed directly into the sleeve without prior formation of threads or indentations in the inside ply.

9 Claims, 4 Drawing Figures

PATENTED JUL 10 1973 3,744,531

PRECISION SPIRALLY WOUND SLEEVE

This is a continuation of application Ser. No. 34,150, filed May 4, 1970.

BACKGROUND OF THE INVENTION

Kraft paper sleeves cut as from glued multi-ply spirally wound paper tubes have been used extensively in a multitude of various industries wherein reasonable strength, some electrical resistance, and low cost are factors. However, variable shrinkage of Kraft paper sleeves makes them less suitable for use as aforesaid because such sleeves are substantially incapable of any radial expansion without rupturing. Moreover, such sleeves of Kraft paper are not dimensionally stable and thus will vary in diameter even due to variation in atmospheric humidity conditions. It has been found that such Kraft paper sleeves with multiple plies glued together must be custom selected if it be desired to snugly fit them onto armature shafts. Otherwise, some sleeves which are only slightly smaller than the shaft are difficult to assemble thereon and are apt to split and others which are larger than the shaft will not stay in place on the shaft as during the coil winding operations, nor will they be radially contracted or compressed into contact with the armature shaft whereby to create balancing and vibration problems in high speed motors. Moreover, if such Kraft paper sleeve has a sliding fit on the armature shaft, then, if the splines on the shaft extend axially beyond the stack of laminations, then such sleeve is apt to be split or ruptured if it be attempted to push it over such splines.

Variable inductance coils as used in television receivers, generally comprise a phenolic tube on which a winding is placed and a movable ferrite core has threaded engagement with a bushing mounted at the end of the phenolic tube. In some cases the tube is a spirally wound tube which is indented to provide thread engaging projections on the inside diameter thereof.

It is known from our copending application Ser. No. 817,464, filed Apr. 18, 1969, to provide an expansible spirally wound paper sleeve in which the plies are of x-crepe Kraft paper, and although such sleeve may be snugly fitted on an armature shaft, it expands in outside diameter and the outside surface is not smooth.

SUMMARY OF THE INVENTION

Contrary to the foregoing, the present invention provides a spirally wound sleeve which has a precise inside diameter which may be enlarged in diameter by radial compression of the inside ply and which has a substantially non-stretchable smooth outside ply which provides a precision outside diameter sleeve which may be snugly fitted as on a shaft with negligible increase in outside diameter, or which may be used as an inductor coil form to adjustably receive a tuning slug screw therein without prior formation of threads in the aforesaid radially compressible inside ply.

Other objects and advantages of the present invention will become apparent as the following description proceeds.

DETAILED DESCRIPTION OF THE INVENTION

Figure 1:
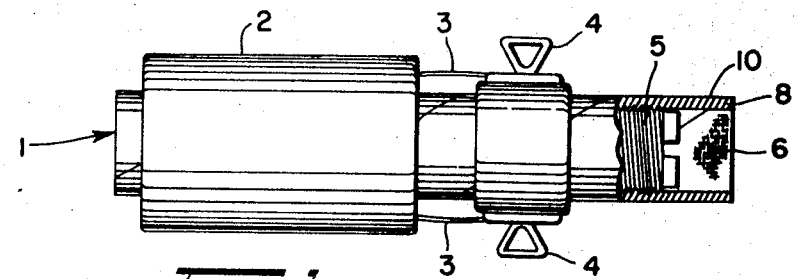
FIG. 1 is a side elevation view partly cut away adjacent one end illustrating the use of the spirally wound sleeve herein as the coil form of an adjustable inductor.
Figure 2:
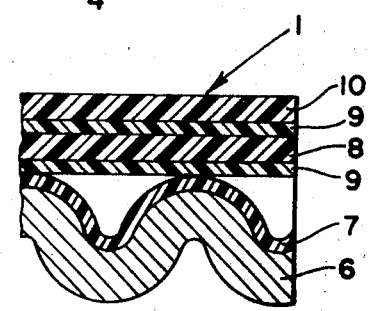
FIG. 2 is a much enlarged fragmentary radial cross-section view illustrating a precision spirally wound sleeve according to the present invention.

As shown in FIG. 1 herein, the spirally wound sleeve 1 constituting the present invention is used as the core or coil form of an adjustable inductor, said sleeve 1 having thereon the coils 2 which have leads 3 connected to solder lugs 4. Screwed directly into the sleeve 1 is a tuning slug 5 as of powdered iron or brass.

A preferred form of sleeve 1 comprises an inside ply 6 of biaxially creped Kraft paper (known as "x-crepe" paper) having on its outside an extruded plastic coating 7 of polypropylene, polyethylene, or like heat sealable plastic. The inside ply 6 is spirally wound on a suitable mandrel (not shown) with its heat sealable plastic coating 7 on the outside thereof. Heat sealed to said inside ply is the middle ply 8 having a heat sealable plastic coating 9 on both its inner and outer surfaces. The outside ply 10 will be applied with its heat sealable plastic coating 9 disposed on the inside whereby as the spirally wound tube is made, the application of heat thereto heat seals and bonds the inner and middle plies 6 and 8 to each other, and heat seals and bonds the middle and outside plies 8 and 10 to each other to form a dimensionally stable and moisture resistant tube of which the diameter may be controlled and predetermined since there are no variables involving shrinkage or atmospheric moisture conditions. The butt joints of the three plies 6, 8, and 10 are axially staggered with respect to one another, thus to form a strong tube which can be cut into lengths to form the sleeves 1 herein.

The biaxially creped Kraft paper constituting the inside ply 6 may be of the type disclosed in U.S. Pat. Nos. 2,071,347, 2,158,087, 2,161,092, 2,494,334, and 2,567,967. As an illustrative example, the inside ply 6 when made of 0.004 inch thick Kraft paper will be of about 0.010 inch thickness when biaxially creped, and the plastic coating 7 may be of 0.001 inch thickness to obtain the heat sealed bond with plastic coating 9 of the middle ply 8.

The middle and outside plies 8 and 10 are preferably of polyester film material of say 0.002 inch thickness which may be prepared from the polymer formed by the condensation reaction between ethylene glycol and dimethyl terephthalate (Mylar) which has great tensile strength, a high melting point, very low moisture absorption and a high dielectric strength which renders it an ideal material for use in electric motors, capacitors, transformers and other electrical and electronic components. Another material with comparable properties is polyimide film which has no melting point and hence can be used for very high temperature applications. Polyimide film also is very strong and has outstanding resistance to mechanical abuse, that is, cut-through, impact, and abrasion resistance thus making it a suitable material for use in electrical and electronic applications.

When the sleeve 1 herein is used as the coil form of an adjustable inductor, for example, the tuning slug 5 may be screwed directly into the sleeve 1 and because of the radial compressibility of the inside ply 6, the threads of the screw slug 5 will embed into the inside ply 6 so that the screw may be turned to axially advance or retract it as desired. Such embedding of the screw threads into the inside ply 6 will not noticeably increase the outside diameter of the sleeve 1.

Figure 3:
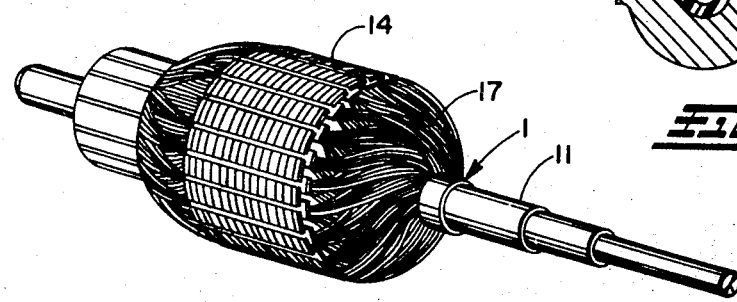
FIG. 3 is a perspective view of an electric motor armature having a sleeve according to the present invention snugly fitted on the shaft thereof.
Figure 4:
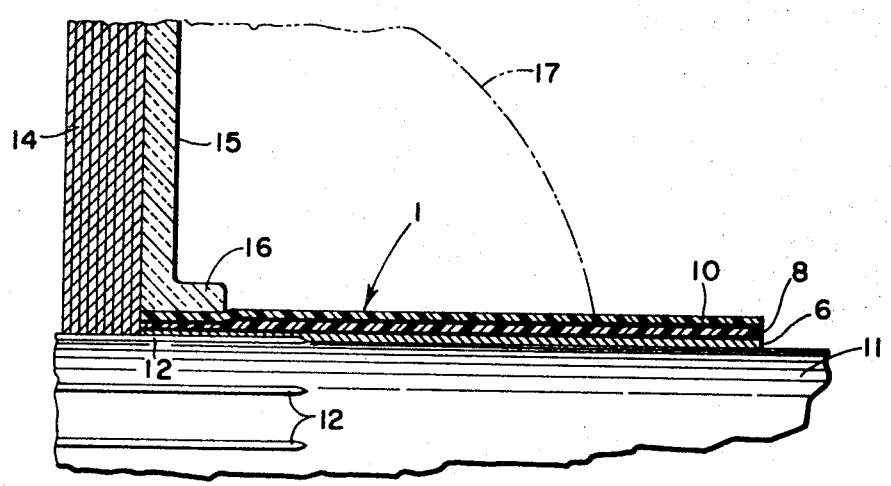
FIG. 4 is a much enlarged fragmentary cross-section view showing how the inside ply is radially compressed by expansion of its inside diameter when the sleeve is snugly fitted on the armature shaft and also showing how the inside ply may be stretched to conform to the splines on the armature shaft which project axially beyond the stack of laminations thereof, and how a fiber ring at the end of the lamination stack firmly secures the sleeve on the shaft to avoid any crevices or cracks to prevent contact of the windings with the shaft or laminations.

Armature shafts 11 (see FIGS. 3 and 4) for electric motors are generally made to close tolerances, for example, the diameter of the shaft 11 may be 0.500 inch +0.002 −0.001. In making the sleeve 1 for that size of armature shaft 11, the inside ply 6 may be wound on an arbor of 0.498 inch diameter and because the inside ply 6 is of x-crepe paper it can be easily assembled on any shaft 11 from 0.499 inch to 502 inch diameter to have a snug fit thereon with virtually no expansion of the outside diameter of the sleeve 1. Moreover, armature shafts 11 generally are provided with splines 12 which key the stack of laminations 14 thereon, the splines 12 generally being made as with a knurling type tool which displaces the metal of the shaft 11 to form a plurality of relatively sharp edged axial ribs therealong. The diametrical distance across such splines 12 may be say, 0.510 inch and because of the nature of the inside ply 6, it is no problem to push the sleeve 1 over the portions of the splines 12 which extend beyond the stack of laminations 14 as shown in FIG. 4. Moreover, a fiber ring 15 having an integral inner lip 16 may be forced over the sleeve 1 and positioned against the end of the stack of laminations 14 to compress the axially inner end portion of the sleeve 1 as in FIG. 4 to securely anchor the sleeve 1 in place and to avoid all cracks or crevices so that none of the windings 17 can make contact with the armature shaft 11 or the laminations 14.

If it be desired to have the sleeve 1 an extremely tight fit on a shaft 11 or the like, the middle and outside plies 8 and 10 may be of heat shrinkable type material, whereby after the sleeve has been pushed over the shaft 11, the application of heat thereto will effect shrinkage of the middle and outside plies 8 and 10 to effect contraction of the inside ply 6 into very tight frictional engagement with the shaft 11.

In certain cases as where it is desired to impregnate the sleeve 1 with varnish or the like, the middle and outside plies 8 and 10 may be of Kraft paper, respectively heat sealed to the inside ply 6 and to each other. When high temperatures are encountered, the outer bonding layer may be a thermosetting resin which will prevent "flagging" of the outer ply 10 under high temperature conditions.

We, therefore, particularly point out and distinctly claim as our invention:

1. A precision spirally wound sleeve which precisely maintains its outside diameter when snugly fitted around an object of outside diameter which, within its minimum and maximum tolerance limits, is slightly larger than the inside diameter of said sleeve, said sleeve comprising at least two axially offset spirally wound butt-jointed plies of which the inside ply is of biaxially creped Kraft paper thus to render said inside ply radially outwardly compressible and of which the surrounding ply is of substantially inextensible flexible material to remain of substantially constant diameter during radial outward compression of said inside ply; and a layer of heat sealing plastic material between said plies, said layer being constituted by coatings of heat sealing plastic material respectively on the entire outside and inside surfaces of said inside and surrounding plies, said coatings being welded together to impart dimensional stability to said sleeve with reference to internal expanding forces and variable ambient moisture conditions, said inside ply being radially outwardly compressed when said sleeve is on such object of larger diameter than the initial inside diameter of said inside ply without increase in outside diameter of said surrounding ply.

2. The sleeve of claim 1 wherein said surrounding ply is of polyester plastic.

3. The sleeve of claim 1 wherein said surrounding ply is of polyimide plastic.

4. The sleeve of claim 1 wherein said surrounding ply is of plain, uncreped Kraft paper.

5. A precision spirally wound sleeve which precisely maintains its outside diameter when snugly fitted around an object of outside diameter which, within its minimum and maximum tolerance limits, is slightly larger than the inside diameter of said sleeve, said sleeve comprising inside, middle and outside axially offset spirally wound butt-jointed plies of which the inside ply is of biaxially creped Kraft paper thus to render said inside ply radially outwardly compressible and of which the middle and outside plies are of substantially inextensible flexible material to remain of substantially constant diameter during radial outward compression of said inside ply; and layers of heat sealing plastic material between said inside and middle plies and between said middle and outside plies respectively bonding said plies together, said layers being constituted by coatings of heat sealing plastic material respectively on the entire outside and inside surfaces of said inside and middle plies and by coatings of heat sealing plastic material respectively on the entire outside and inside surfaces of said middle and outside plies, said coatings being welded together to impart dimensional stability to said sleeve with reference to internal expanding forces and variable ambient moisture conditions, said inside ply being radially outwardly compressed when said sleeve is on such object of larger diameter than the initial inside diameter of said inside ply without increase in outside diameter of said outside ply.

6. The sleeve of claim 5 wherein said middle and outside plies are polyester plastic.

7. The sleeve of claim 5 wherein said middle and outside plies are polyimide plastic.

8. The sleeve of claim 5 wherein said middle and outside plies are plain, uncreped Kraft paper.

9. The sleeve of claim 8 wherein the layer of heat sealing material between said outside and middle plies is a thermosetting resin to prevent ply separation at elevated temperature.

* * * * *